United States Patent
Asenjo et al.

(10) Patent No.: US 10,250,438 B2
(45) Date of Patent: *Apr. 2, 2019

(54) CLOUD BASED DRIVE MONITORING SOLUTION

(71) Applicant: Rockwell Automation Technologies, Inc., Mayfield Heights, OH (US)

(72) Inventors: Juan L. Asenjo, Timberlake, OH (US); Francisco Maturana, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,505

(22) Filed: Mar. 13, 2018

(65) Prior Publication Data
US 2018/0205606 A1   Jul. 19, 2018

Related U.S. Application Data

(63) Continuation of application No. 15/478,761, filed on Apr. 4, 2017, now Pat. No. 9,929,905, which is a
(Continued)

(51) Int. Cl.
*G06F 15/173* (2006.01)
*H04L 12/24* (2006.01)
(Continued)

(52) U.S. Cl.
CPC ........ *H04L 41/0813* (2013.01); *G05B 19/048* (2013.01); *G05B 23/0297* (2013.01);
(Continued)

(58) Field of Classification Search
CPC . H04L 41/0813; H04L 43/0817; H04L 43/04; H04L 41/046; G05B 23/0297;
(Continued)

(56) References Cited

U.S. PATENT DOCUMENTS

| 7,463,935 B1 | 12/2008 | Miller et al. |
| 8,819,701 B2 | 8/2014 | Wheeler et al. |

(Continued)

FOREIGN PATENT DOCUMENTS

| CN | 202267864 | 6/2012 |
| EP | 1672535 A1 | 6/2006 |

OTHER PUBLICATIONS

"Design and Implementation on Automation Data management System in Oil Filed", Wang Hui, Chinese Master's Theses Full-text Database Information Science and Technology 2012, No. 2, (English Translation provided) pp. 1138-1811.
(Continued)

*Primary Examiner* — Krisna Lim
(74) *Attorney, Agent, or Firm* — Fay Sharpe LLP

(57) ABSTRACT

A cloud-based remote monitoring system and method monitor one or more industrial devices of an industrial facility, including a local data historian located to monitor one or more parameters from the industrial devices, and store parameters in a local storage associated with the data historian, as well as a cloud agent located at the industrial facility to collect data indicative of a past and/or a present state of the industrial devices from the data historian local storage according a manifest specific to the industrial facility. The cloud agent sends the collected data to a cloud platform according to the manifest, and dynamically reconfigures the cloud agent without interrupting the collecting and the sending.

25 Claims, 12 Drawing Sheets

Related U.S. Application Data continuation of application No. 13/798,430, filed on Mar. 13, 2013, now Pat. No. 9,647,906.

(60) Provisional application No. 61/721,859, filed on Nov. 2, 2012.

(51) Int. Cl.
*G05B 19/048* (2006.01)
*G05B 23/02* (2006.01)
*H04L 12/26* (2006.01)
*G06F 16/21* (2019.01)
*G05B 19/418* (2006.01)

(52) U.S. Cl.
CPC ............ *H04L 41/046* (2013.01); *H04L 43/04* (2013.01); *H04L 43/0817* (2013.01); *G05B 19/4185* (2013.01); *G05B 2219/13* (2013.01); *G05B 2219/31151* (2013.01); *G05B 2223/06* (2018.08); *G06F 16/21* (2019.01); *Y02P 90/86* (2015.11)

(58) Field of Classification Search
CPC .............. G05B 19/048; G05B 19/4185; G05B 2223/06; G05B 2219/31151; G05B 2219/13

See application file for complete search history.

(56) References Cited

U.S. PATENT DOCUMENTS

| | | |
|---|---|---|
| 2005/0108453 A1 | 5/2005 | Maturana et al. |
| 2008/0081579 A1 | 4/2008 | Chen et al. |
| 2008/0125877 A1 | 5/2008 | Miller et al. |
| 2008/0140356 A1 | 6/2008 | Sanford et al. |
| 2008/0291918 A1 | 11/2008 | Turcot |
| 2009/0171475 A1 | 1/2009 | Gorsek |
| 2009/0210071 A1 | 8/2009 | Agrusa et al. |
| 2010/0211928 A1 | 8/2010 | Resnick et al. |
| 2010/0256795 A1 | 10/2010 | McLaughlin et al. |
| 2010/0278086 A1 | 11/2010 | Pockiraju et al. |
| 2010/0333116 A1 | 12/2010 | Prahlad et al. |
| 2012/0320928 A1 | 12/2012 | Takada et al. |
| 2013/0211546 A1 | 8/2013 | Lawson et al. |
| 2013/0211559 A1 | 8/2013 | Lawson et al. |
| 2013/0268357 A1 | 10/2013 | Heath |
| 2014/0026179 A1 | 1/2014 | Devarajan et al. |
| 2015/0281319 A1* | 10/2015 | Maturana .............. G06F 9/5072 709/202 |
| 2016/0132538 A1* | 5/2016 | Bliss ................ G05B 19/41855 707/741 |
| 2018/0173205 A1* | 6/2018 | Miller ................ G05B 19/0426 |

OTHER PUBLICATIONS

"Windows Azure User's Guide" Windows Azure Technical Documentation Library, msdn.microsoft.com/en-us/library/windowsazure//dd163896.aspx, obtained from the internet in Jul. 2013.

\* cited by examiner

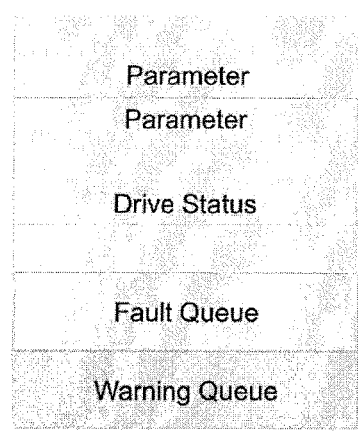

FIGURE 2

| Bit | Enum Text | Description |
|---|---|---|
| 0 | Ready | The drive is in Ready condition. |
| 1 | Running | The drive is Running. |
| 2 | Command Dir | Commanded direction of rotation, 1 is Forward 0 is Reverse |
| 3 | Rotation Dir | Actual Direction of rotation 1 is Forward 0 is Reverse |
| 4 | Accelerating | The drive is accelerating. |
| 5 | Decelerating | The drive is decelerating. |
| 6 | At Speed | The drive has reached commanded speed. |
| 7 | On Bypass | The drive is currently running on bypass. |
| 8 | Rev Enabled | Reverse rotation of the drive has been enabled (Refer Special Features) |
| 9 | Drive Fault | Drive is in Fault mode |
| 10 | Drive Warn | Drive is in Warning mode |
| 11 | Local Lock | An adaptor has local control of the drive |
| 12 | Forced Stop | DPI adapter has issued a forced stop command |
| 13 | Speed Com1 | Speed reference source |
| 14 | Speed Com2 | Speed reference source |
| 15 | Speed Com3 | Speed reference source |

FIGURE 3

```
<?xml version="1.0"?>
<ArrayOfPowerFlex7Info xmlns:xsd="http://www.w3.org/2001/XMLSchema" xmlns:xsi="http://www.w3.org/2001/XMLSchema-instance">
  <PowerFlex7Info>
    <PowerFlex7Id>10001</PowerFlex7Id>
    <IPAddress>10.91.76.177</IPAddress>
    <PowerFlex7Name>Mequon Demo</PowerFlex7Name>
    <ListOfParametersConfigurationFile>D:\TFS Local\AzureUploadData\RACloudAgent\bin\Debug\PowerFlex7ParameterList.config</ListOfParametersConfigurationFile>
  </PowerFlex7Info>
  <PowerFlex7Info>
    <PowerFlex7Id>10002</PowerFlex7Id>
    <IPAddress>10.92.4.92</IPAddress>
    <PowerFlex7Name>Matthew</PowerFlex7Name>
    <ListOfParametersConfigurationFile>D:\TFS Local\AzureUploadData\RACloudAgent\bin\Debug\PowerFlex7ParameterList.config</ListOfParametersConfigurationFile>
  </PowerFlex7Info>
  <PowerFlex7Info>
    <PowerFlex7Id>10003</PowerFlex7Id>
    <IPAddress>10.92.4.235</IPAddress>
    <PowerFlex7Name>Wayne</PowerFlex7Name>
    <ListOfParametersConfigurationFile>D:\TFS Local\AzureUploadData\RACloudAgent\bin\Debug\PowerFlex7ParameterList.config</ListOfParametersConfigurationFile>
  </PowerFlex7Info>
</ArrayOfPowerFlex7Info>
```

FIGURE 4

```xml
<?xml version="1.0"?>
<ArrayOfPowerFlex7ParameterInfo xmlns:xsd="http://www.w3.org/2001/XMLSchema" xmlns:xsi="http://www.w3.org/2001/XMLSchema-instance">
  <PowerFlex7ParameterInfo>
    <ParameterName>Drive Status</ParameterName>
    <Unit></Unit>
    <Service>0</Service>
    <Class>3</Class>
    <Instance>258</Instance>
    <Attribute>9</Attribute>
    <RecordTimeStamp>0001-01-01T00:00:00</RecordTimeStamp>
  </PowerFlex7ParameterInfo>
  <PowerFlex7ParameterInfo>
    <ParameterName>Line Speed</ParameterName>
    <Unit></Unit>
    <Service>0</Service>
    <Class>3</Class>
    <Instance>289</Instance>
    <Attribute>9</Attribute>
    <RecordTimeStamp>0001-01-01T00:00:00</RecordTimeStamp>
  </PowerFlex7ParameterInfo>
  <PowerFlex7ParameterInfo>
    <ParameterName>Line current</ParameterName>
    <Unit></Unit>
    <Service>0</Service>
    <Class>3</Class>
    <Instance>122</Instance>
    <Attribute>9</Attribute>
```

CLOUD BASED DRIVE MONITORING SOLUTION

RELATED APPLICATIONS

This application is a continuation of U.S. patent application Ser. No. 15/478,761, filed Apr. 4, 2017, entitled CLOUD BASED DRIVE MONITORING SOLUTION, which is a continuation of, and claims priority to and the benefit of U.S. patent application Ser. No. 13/798,430, filed Mar. 13, 2013, entitled CLOUD BASED DRIVE MONITORING SOLUTION, U.S. Pat. No. 9,647,906, issued May 9, 2017, which claims priority to and the benefit of U.S. Provisional Patent Application No. 61/721,859, filed Nov. 2, 2012, the entirety of which applications are hereby incorporated by reference.

BACKGROUND INFORMATION

The present exemplary embodiments relate to remote monitoring. They find particular application in conjunction with industrial devices, such as the POWERFLEX 7000, and will be described with particular reference thereto. However, it is to be appreciated that the present exemplary embodiments are also amenable to other like applications.

Maintaining stability and integrity of industrial devices is a high priority. Industrial devices include, for example, motor drives, such as the POWERFLEX 7000. Motor drives are used to generate and provide alternating current (AC) output power to a motor. Failure to maintain the stability and integrity of industrial devices can affect production and prove costly to entities employing the industrial devices. Further, maintaining the stability and integrity of industrial devices can prove dangerous to those relying upon industrial equipment to, for example, generate power or pump gas to generate heat.

To maintain stability and integrity of industrial devices, industrial devices can be locally or remotely monitored for anomalies and/or patterns indicative of failure. Traditionally, industrial devices have been locally monitored. However, industrial equipment may not always be easily accessed. Further, those with the technical know how to identify anomalies and/or patterns indicative of failure may not be on-site. Sending maintenance and/or repair personnel to a field installation is costly. Remote monitoring provides a solution to these challenges.

Previous remote monitoring implementations involved customized software and infrastructure configurations, which are cumbersome to maintain and update. Further, on-premise data collection required by such remote monitoring systems consumes large amounts of data storage. Moreover, since potentially sensitive plant data is to be transmitted to a remote viewer, secure data transmission channels are required.

The present application provides a new and improved system and method which overcome the above-referenced problems and others.

BRIEF DESCRIPTION

In accordance with one aspect of the present disclosure, a cloud-based remote monitoring system for monitoring an industrial facility is provided. The industrial facility includes one or more industrial devices. The system includes a cloud-based remote monitoring system and method monitor one or more industrial devices of an industrial facility, including a local data historian located to monitor one or more parameters from the industrial devices, and store parameters in a local storage associated with the data historian, as well as a cloud agent located at the industrial facility to collect data indicative of a past and/or a present state of the industrial devices from the data historian local storage according a manifest specific to the industrial facility. The cloud agent sends the collected data to a remote cloud platform according to the manifest, and dynamically reconfigures the cloud agent without interrupting the collecting and the sending.

In accordance with another aspect of the present disclosure, a cloud-based remote monitoring method for monitoring an industrial facility is provided. The industrial facility includes one or more industrial devices. By at least one processor located at the industrial facility, data indicative of a past and/or a present state of the industrial devices is collected according a manifest specific to the industrial facility. Further, the collected data is sent to a remote cloud platform according to the manifest and the at least one processor is dynamically reconfigured without interrupting the collecting and the sending.

In accordance with another aspect of the present disclosure, a cloud-based remote monitoring system for monitoring an industrial facility is provided. The industrial facility includes one or more industrial devices. The system includes a cloud agent located at the industrial facility and configured to, by at least one processor, collect data indicative of a past and/or a present state of the industrial devices according a manifest specific to the industrial facility. The cloud agent is further configured to send the collected data to a remote cloud platform according to the manifest. The collected data is sent to corresponding queues of the cloud platform based on data type. The cloud agent is further configured to dynamically reconfigure the cloud agent without interrupting the collecting and the sending. The cloud platform processes the sent data from the queues to facilitate remote monitoring of the industrial devices, data in each queue processed differently.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 2 illustrates an example memory layout of an industrial device;

FIG. 3 illustrates an example bit layout of a status parameter of an industrial device;

FIG. 4 illustrates part of an example manifest listing motor drives to monitor;

FIG. 5 illustrates part of an example manifest listing parameters to monitor for motor drives;

FIG. 10 illustrates an example historical alarms webpage for a motor drive that can be viewed by a web client;

DETAILED DESCRIPTION

Figure 1:
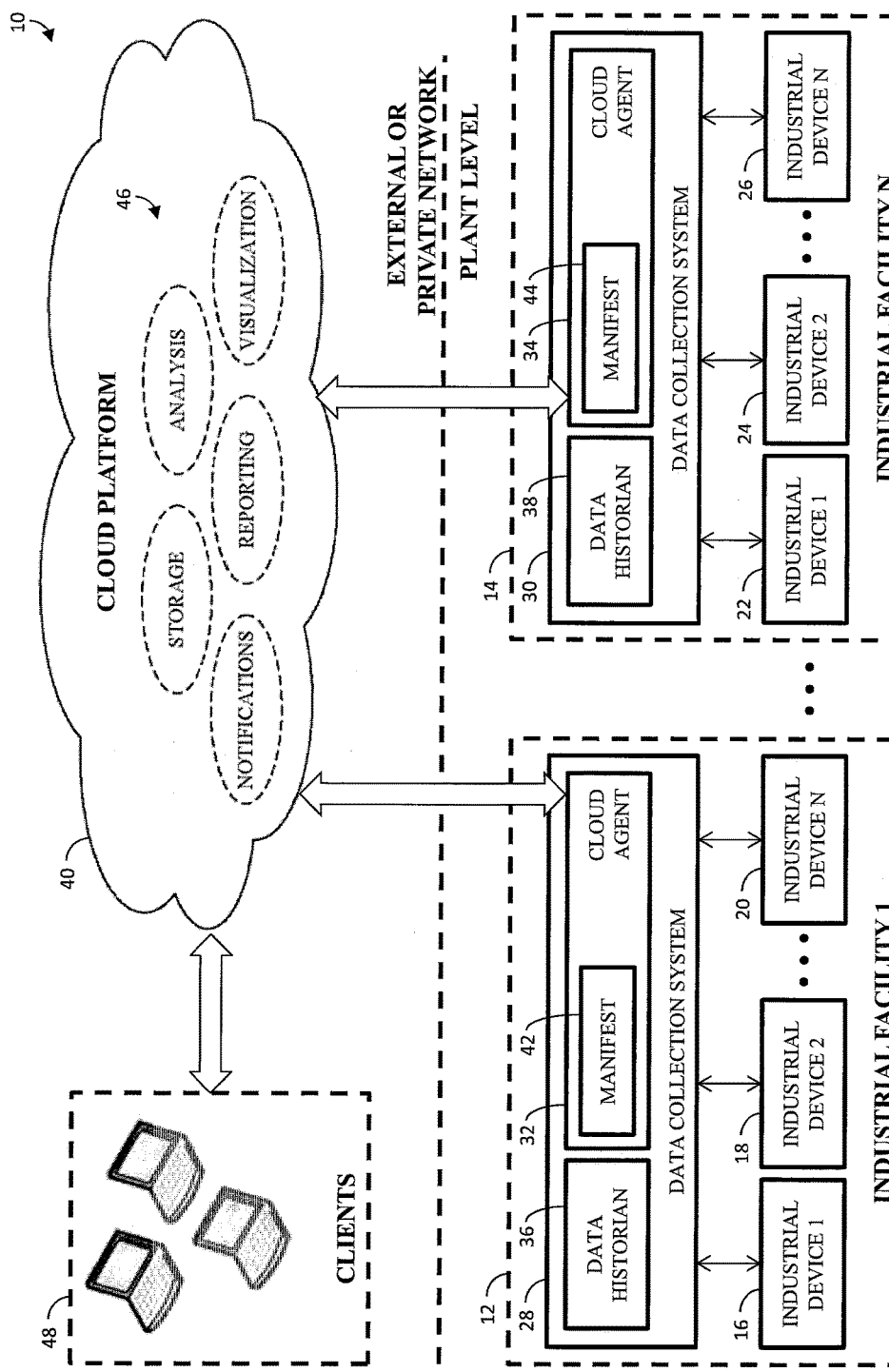
FIG. 1 illustrates a cloud-based remote monitoring system.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

With reference to FIG. 1, a cloud-based remote monitoring system 10 including one or more industrial facilities 12, 14 is provided. Each industrial facility 12, 14 corresponds to an industrial enterprise. For example, a first industrial facility can correspond to a first industrial enterprise, and a second industrial facility can correspond to a second industrial enterprise. As another example, the first and second industrial facilities can correspond to a common industrial enterprise. The industrial facilities 12, 14 can be fixed (e.g., a plant facility) and/or mobile (e.g., a system contained in a truck or other service vehicle).

Each industrial facility 12, 14 includes one or more industrial devices 16, 18, 20, 22, 24, 26. The industrial devices 16, 18, 20, 22, 24, 26 can include one or more of: industrial controllers (e.g., programmable logic controllers or other types of programmable automation controllers); field devices (e.g., sensors and meters); motor drives (e.g., the POWERFLEX 7000); operator interfaces (e.g., human-machine interfaces, industrial monitors, graphic terminals, message displays, etc.); industrial robots, barcode markers and readers; vision system devices (e.g., vision cameras); smart welders; and other such industrial devices.

Each of the industrial devices 16, 18, 20, 22, 24, 26 includes one or more memories. The memories include externally readable data (external to the industrial device) indicative of the present and/or past state of the industrial device. For example, the memories can include one or more of: 1) one or more configurable parameters controlling the operation of the industrial device; 2) one or more parameters indicating the status of the industrial device; 3) one or more warning, fault or alarm parameters indicating one or more of warnings, faults and alarms, respectively, with the industrial device; and 4) one or more queues, each with one or more of warnings, faults and alarms with the industrial device. Referring to FIG. 2, an example memory layout of an industrial device is illustrated. Referring to FIG. 3, an example table illustrating the bit layout of a status parameter of an industrial device is illustrated.

The industrial devices 16, 18, 20, 22, 24, 26 make up one or more automation systems operating within the respective facilities. Exemplary automation systems can include one or more of: 1) batch control systems (e.g., mixing systems); 2) continuous control systems (e.g., proportional-integral-derivative (PID) control systems); and 3) discrete control systems. Exemplary automation systems can include one or more industrial controllers that facilitate monitoring and control of respective processes. The controllers exchange data with field devices using native hardwired input/output (I/O) and/or using industrial facility networks (e.g., Ethernet/Internet Protocol (IP), Data Highway Plus, ControlNet, Devicenet, etc.).

A given controller typically receives any combination of digital and analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Each industrial facility 12, 14 includes an on-premise data collection system 28, 30 communicatively coupled to the respective industrial devices 16, 18, 20, 22, 24, 26 using one or more associated network connections and any suitable protocol. In some embodiments, control interface protocol (CIP) and/or distributed protocol interface (DPI) may be used for communication between the industrial devices 16, 18, 20, 22, 24, 26 and the data collection system 28, 30. Using CIP and/or DPI, the data collection system 28, 30 is configurable to monitor controlled processes and device status through receipt of information related to the monitored devices and/or associated processes.

The data collection system 28, 30 includes a cloud agent 32, 34 configured to collect live data (e.g., status parameter values) and/or historical data (e.g., alarm history, fault history, warning history, status history, trend data, etc.) from the industrial devices 16, 18, 20, 22, 24, 26, directly and/or indirectly by, for example, accessing an optional data historian 36, 38 of the data collection system 28, 30. The data historian 36, 38 monitors one or more industrial devices and stores data in local storage associated with the data historian. This data can include historical data and/or live data read from the monitored devices. It's advantageous to use the data historian 36, 38 as the data source when there are a large number of data points to monitor.

The cloud agent 32, 34 is further configured to transmit the collected data to a cloud platform 40 of the cloud-based remote monitoring system 10. The data can be prioritized before transmission to the cloud platform 40. Further, the data can be transmitted with priorities indicating the order with which the cloud platform 40 processes the data. The cloud agent 32, 34 can further specify how transmitted data is to be processed, for example, to allow additional data types to be processed by the cloud platform 40. If an industrial device becomes disconnected, powered off or otherwise unavailable, an alarm is sent to the cloud platform 40. The cloud agent 32, 34 can be, for example, a Windows service that periodically collects and transmits serialized and compressed data into the cloud platform 40 using standard web services over hypertext transfer protocol secure (HTTPS)/secure sockets layer (SSL).

The cloud agent 32, 34 is configured by a site-specific manifest 42, 44. The manifest 42, 44 can include a plurality of files and is typically in extensible markup language (XML). The manifest 42, 44 can identify the frequencies with which data should be collected from the respective industrial devices 16, 18, 20, 22, 24, 26. Typically, the frequencies are specific to the industrial devices 16, 18, 20, 22, 24, 26 and/or types of data (e.g., alarms, faults, warnings, status parameters, configurable parameters, historical data, live data, etc.). Even more, the manifest 42, 44 can identify how the data transmitted to the cloud platform 40 is processed by the cloud platform 40. Also, the manifest 42, 44 can specify the priority with which data is processed by the cloud platform 40.

Further, the manifest 42, 44 identifies which of the industrial devices 16, 18, 20, 22, 24, 26 to collect live data and/or historical data for, and what data to collect from the industrial devices 16, 18, 20, 22, 24, 26. The data to collect is suitably specified for each industrial device 16, 18, 20, 22, 24, 26 or individual type of device by identifying one or more parameters in the memories of industrial devices and/or by identifying alarms, faults and/or warnings to collect from the memories of industrial devices. For example, the manifest 42, 44 can indicate the ready bit (see FIG. 3) is to be monitored for an industrial device. As another example, the manifest can indicate the five most recent alarms in an alarm queue of an industrial device are to be collected. FIG. 4 illustrates part of an example manifest listing POWERFLEX 7000 drives to monitor. FIG. 5 illustrates part of an example manifest listing parameters to monitor for POWERFLEX 7000 drives.

Moreover, the manifest 42, 44 can identify the priorities and/or upload rates of the different types of data transmitted to the cloud platform 40. For instance, historical data may be transmitted to the cloud platform 40 for off-site monitoring at a low priority and a low rate, whereas other data can be transmitted at a higher priority and a higher rate. The manifest 42, 44 can also specify that certain data is characterized as "live data", which may be used by an off-site monitoring facility for process monitoring or other monitoring purposes. In such a case, the manifest 42, 44 may define such "live data" as being of high priority (e.g., lower priority than alarm data, but higher priority than historical data), and may specify a corresponding high upload rate for such "live data".

The cloud agent 32, 34 is dynamically configurable to allow changes to be made to the respective manifest 42, 44 during runtime. For example, the number and type of monitored devices can be changed at any time. As another example, the cloud agent 32, 34 allows the priority and upload rate settings for a given type of data to be dynamically set. This, in turn, allows a remote monitor to adjust the upload rate and/or priority for a given device, for example, to facilitate troubleshooting from a remote location. Such adjustments, moreover, may be advantageous in process monitoring applications, for instance, in which a remote user desires higher granularity data with respect to a controlled process at the customer site, and can employ dynamic adjustments to the rate and/or priority settings of the manifest 42, 44 to adjust the speed of data monitoring.

Further, the cloud agent 32, 34 can include multi-threading capabilities to facilitate scalability and to prevent failed industrial devices from blocking data collection from other industrial devices. Upon detecting a failed industrial device, the cloud agent 32, 34 can also generate an alarm to the cloud platform 40 indicative of the failure.

In some embodiments, the cloud agent 32, 34 includes a collection service and a queue processing service. The collection service stores the collected data (e.g., to a working directory), typically in a compressed state. A priority indicating the priority by which the cloud platform processes the data can also be added according to the manifest 42, 44. The queue processing service then creates a data packet from the stored data and uploads the data packet to a temporary storage in the cloud platform 40. The order with which the data packet is uploaded relative to other data packets can be controlled by a priority of the data packet.

Further, in some embodiments, the cloud agent is configured by the manifest 42, 44 to, for each industrial device 16, 18, 20, 22, 24, 26, read the list of parameters that have been configured for the device and upload data to the cloud platform 40. Further, if there is a fault queue and/or a warning queue, the cloud agent 32, 34, for each industrial device 16, 18, 20, 22, 24, 26, reads the status to determine if there is a fault and/or a warning. If there is a fault, the most recent fault is read from the fault queue and uploaded to the cloud platform 40. Similarly, if there is a warning, the most recent warning is read from the warning queue and uploaded to the cloud platform 40.

The cloud platform 40 can be any infrastructure that allows computing services 46 to be accessed and utilized by cloud-capable devices. For example, the cloud platform 40 can be MICROSOFT's AZURE cloud platform. The cloud platform 40 can be a public cloud accessible via the Internet by devices having Internet connectivity and appropriate authorizations to utilize the services. In some scenarios, the cloud platform 40 can be provided by a cloud provider as a platform-as-a-service (PaaS), and the services 46 can reside and execute on the cloud platform 40 as a cloud-based service. In some such configurations, access to the cloud platform 40 and the services 46 can be provided to customers as a subscription service by an owner of the services. For example, the services can be provided using a software-as-a-service (SaaS) service model. Alternatively, the cloud platform 40 can be a private cloud operated internally by an industrial enterprise. An exemplary private cloud can comprise a set of servers hosting the cloud services 46 and residing on a corporate network protected by a firewall.

The cloud services 46 can include one or more of data storage, data analysis, control applications (e.g., applications that can generate and deliver control instructions to industrial devices based on analysis of real-time system data or other factors), visualization applications (e.g., a cloud-based operator interface system), reporting applications, enterprise resource planning (ERP) applications, notification services, and other such applications. In some embodiments, the cloud services 46 include a diagnostic service monitoring the health of respective automation systems or their associated industrial devices across an entire industrial facility, or across multiple industrial facilities that make up an industrial enterprise. Further, in some embodiments, the cloud services 46 include a control application used to track a unit of product through its stages of production and collect production data for each unit as it passes through each stage (e.g., barcode identifier, production statistics for each stage of production, quality test data, abnormal flags, etc.). Even more, in some embodiments, the cloud services 46 include an application monitoring for the unavailability of an industrial facility (e.g., due to a power outage) and generating an alert or notification (e.g., an email notification) in response to such an event.

The industrial devices 16, 18, 20, 22, 24, 26 suitably interact with the cloud services 46 through the cloud agent 32, 34. Advantageously, this allows the industrial devices 16, 18, 20, 22, 24, 26 to be used with the cloud platform 40 without modification. However, direct interaction between the cloud services 46 and at least some of the industrial devices 16, 18, 20, 22, 24, 26 is also contemplated. For example, industrial devices having smart configuration capability can be configured to automatically detect and communicate with the cloud platform 40 upon installation at any facility, simplifying integration with existing cloud-based data storage, analysis, or reporting applications used by the industrial enterprise.

Upon receiving data from the cloud agent 32, 34, the cloud platform 40 processes the data using the cloud services 46. This can include adding the data in temporary storage for subsequent processing. The order with which the data packet is subsequently processed can be governed by a priority accompanying the data. The processing typically includes: 1) analyzing the data and storing the results of the analysis in permanent storage; and/or 2) storing the data in permanent storage. The results and/or the data can, in turn, be used to generate notifications (e.g., email notifications of potential problems with industrial devices) to users of the cloud platform 40, reports, and/or visualizations. Reports, visualizations, and other service outputs are typically stored in permanent storage.

Once the cloud platform 40 has processed received data, the received data and/or data derived from the received data are made available to one or more clients 48 of the cloud platform 40 for viewing. The clients 48 can also be employed to remotely update the manifest 42, 44 of an industrial facility. For example, a client can initiate selective adjustment to a manifest to change upload speeds, priorities or add monitored devices. The clients 48 can include web clients communicating with the cloud platform 40 using, for example, hypertext transfer protocol (HTTP) or HTTPS. The clients 48 can also include clients using specialized software to communicate with the cloud platform 40. Advantageously, the clients 48 allow remote monitoring of the industrial devices 16, 18, 20, 22, 24, 26 without being on-site. Further, problems can advantageously be more easily diagnosed by those with the requisite skill to do so.

In some embodiments, the clients 16, 18, 20, 22, 24, 26 include a monitoring center. The monitoring center can be managed by an industrial enterprise to monitor its industrial facilities. Alternatively, the monitoring center can be managed by a third party to monitor the industrial facilities of one or more industrial enterprises. In this case, the third party can charge the industrial enterprises a fee for the monitoring.

Providing industrial devices with cloud capability can offer a number of advantages particular to industrial automation. The cloud platform 40 can be easily scaled to accommodate differing amounts of data storage and processing. Further, the cloud platform 40 can be easily extended to increase functionality. For example, the cloud platform 40 can be extended to provide a motor control center (MCC).

The cloud platform 40 also provides a cost effective solution for industrial enterprises to monitor industrial devices. Industrial enterprises do not have to maintain a data center infrastructure or patch software running in the data center infrastructure. Further, the cloud platform 40 does away with high upfront costs and defers costs over a period of time when using a PaaS or SaaS service model. Even more, monitoring and diagnosis are also improved since on-site visits by those with requisite skill to identify future issues and/or diagnosis issues are not required. Moreover, multiple industrial facilities at different geographical locations can migrate their respective automation data to the cloud for aggregation, collation, collective analysis, and enterprise-level reporting without the need to establish a private network between the facilities.

Figure 6:
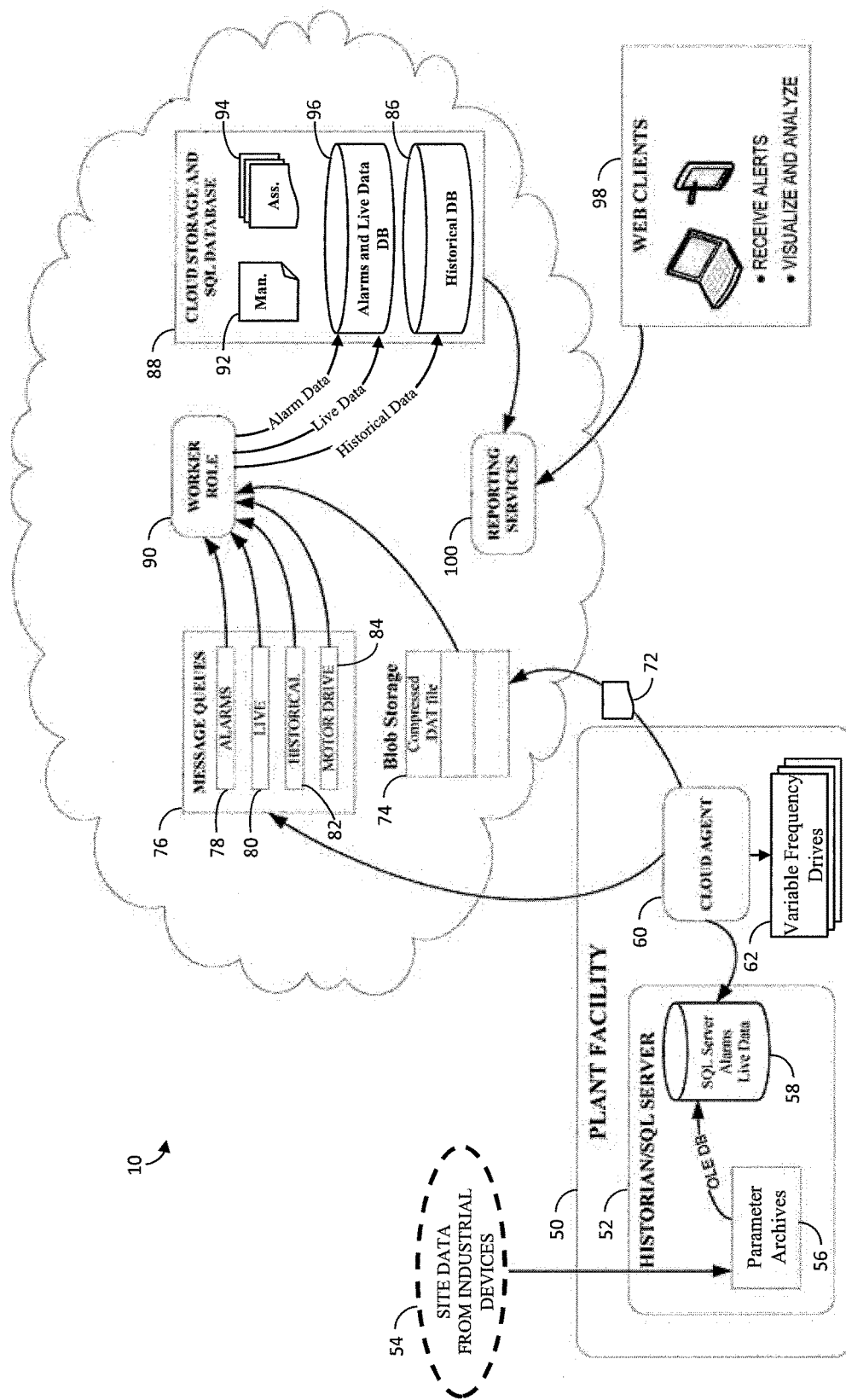
FIG. 6 illustrates a detailed embodiment of the cloud-based remote monitoring system of FIG. 1.

With reference to FIG. 6, a detailed embodiment of the cloud-based remote monitoring system 10 of FIG. 1 is provided. This embodiment leverages the cloud platform 40 to provide remote monitoring services to an industrial enterprise (i.e., a customer) using, for example, a SaaS service model.

As illustrated, a plant facility 50 includes an on-premise data historian 52 collecting live and/or historical data from industrial devices (e.g., data 54 generated by one or more industrial controllers) at the plant facility 50. For example, the data historian 52 monitors one or more parameters in parameters archives 56 received from the industrial devices and stores data in local storage 58 associated with the data historian 52 (e.g., a structured query language (SQL) server database). This can include both historical data (e.g., alarm history, warning history, fault history, status history, trend data, etc.), as well as live data values read from the industrial devices.

An on-premise cloud agent 60 at the plant facility 50 is configured to collect live and/or historical data from the industrial devices, either directly (e.g., from one or more variable frequency drives 62) or indirectly (e.g., by accessing the data historian 52). The process of collecting the data involves intelligent sorting and organizing based on time of occurrence and user-defined priorities. The cloud agent 60 can be, for example, a Windows service that periodically collects and transmits serialized and compressed data to the cloud platform using standard web services over HTTPS/SSL. As illustrated, the data historian 52 is a data source for the cloud agent 60. The use of a data historian is advantageous when there are a large number of data points to monitor. However, the cloud agent 60 can additionally or alternatively collect data directly from the industrial devices (e.g., through a CIP link), as illustrated with respect to the variable frequency drives 62, or through middleware applications (e.g., open productivity and connectivity (OPC) clients).

Figure 7:
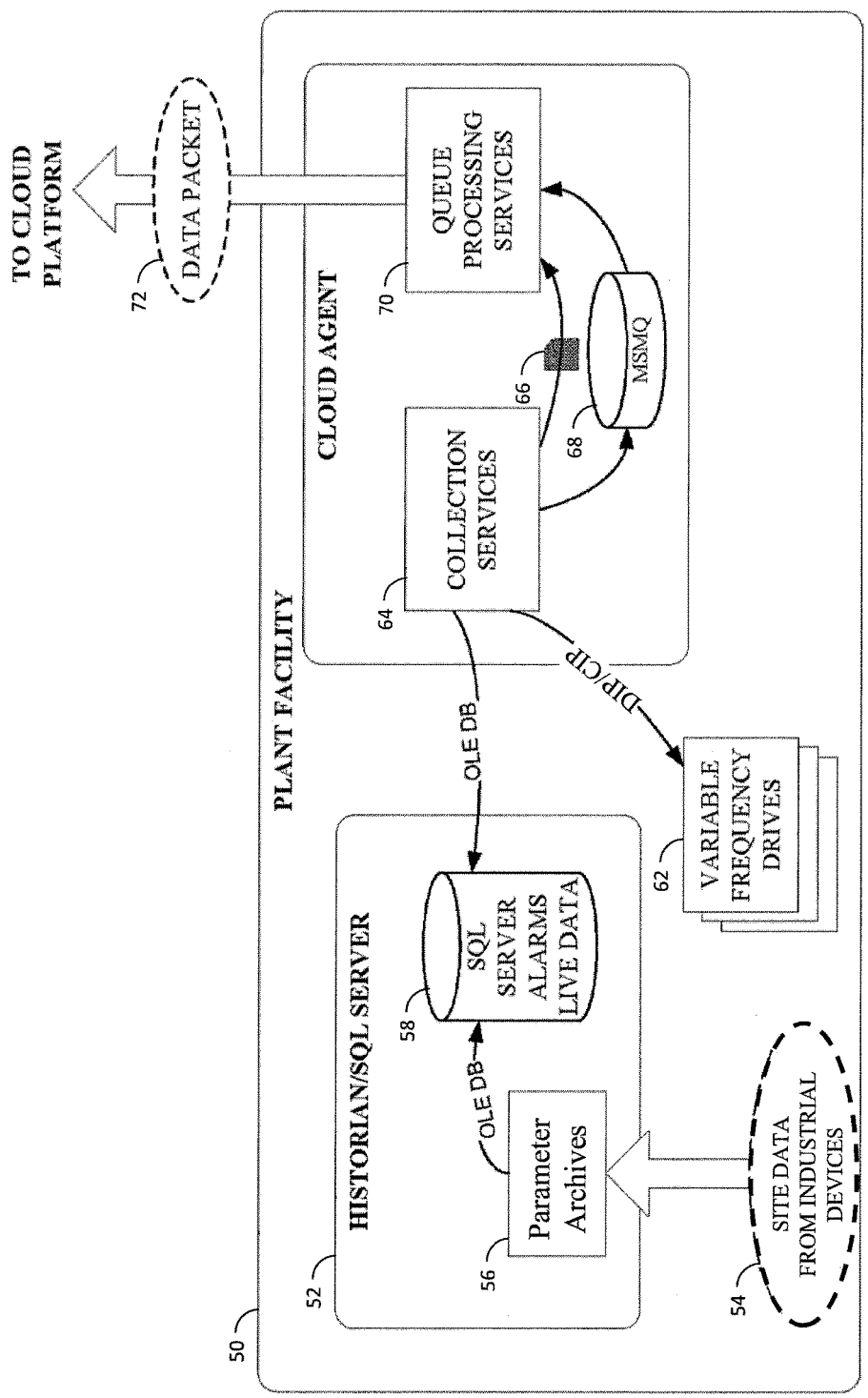
FIG. 7 illustrates more detail of the cloud agent of FIG. 6.

With reference to FIG. 7, a more detailed illustration of the cloud agent 60 is provided. The cloud agent 60 includes a collection service 64 that collects data directly from the industrial devices (e.g., the variable frequency drives 62), and/or indirectly from the industrial devices (e.g., by way of the data historian 52), via a CIP link or other suitable communication protocol. The collection service 64 is controlled by a site-specific manifest, which can specify one or more of what data to be collected, how often to collect the data, how to retrieve data from the industrial devices, and so on. For example, the manifest can specify that the following should be collected for a specific type of motor drive: motor speed; motor power; motor voltage; motor current; drive status; last warning; and last fault. The collection service 64 stores the collected data in a data file 66, typically a compressed data file. In addition, reference to the stored data file 66 is added to a queue 68 (e.g., a MICROSOFT Message Queue Server (MSMQ) database). The queue 68 can be prioritized based on priorities specified in the manifest. These priorities can be specific to different parameters, different types of data, different industrial devices, different types of industrial devices, etc.

A queue processing service 70 of the cloud agent 60 reads the data file 66 in the order it appears in the queue 68. Based on the manifest, the queue processing service 70 packages the data file 66 into a data packet 72 and pushes the data packet 72 to the cloud platform 40. The data packet 72 includes a header which can include customer-specific data read from the manifest. This customer-specific data can include, for example, a behavioral assembly ID and/or priority for processing the data of the data packet. As discussed hereafter, behavior assemblies implement customer-site capabilities to process monitored data and are typically specific to different types of data. Alternatively, instead of including the customer-specific data wholly within the header, this customer-specific data can at least partially be included in an event data notification, which is generated and pushed to the cloud platform 40 concurrently with the data packet 72 and in accordance with the manifest. The queue processing service 70 can also encrypt and send storage account keys to the cloud platform 40 for user verification.

Figure 8:
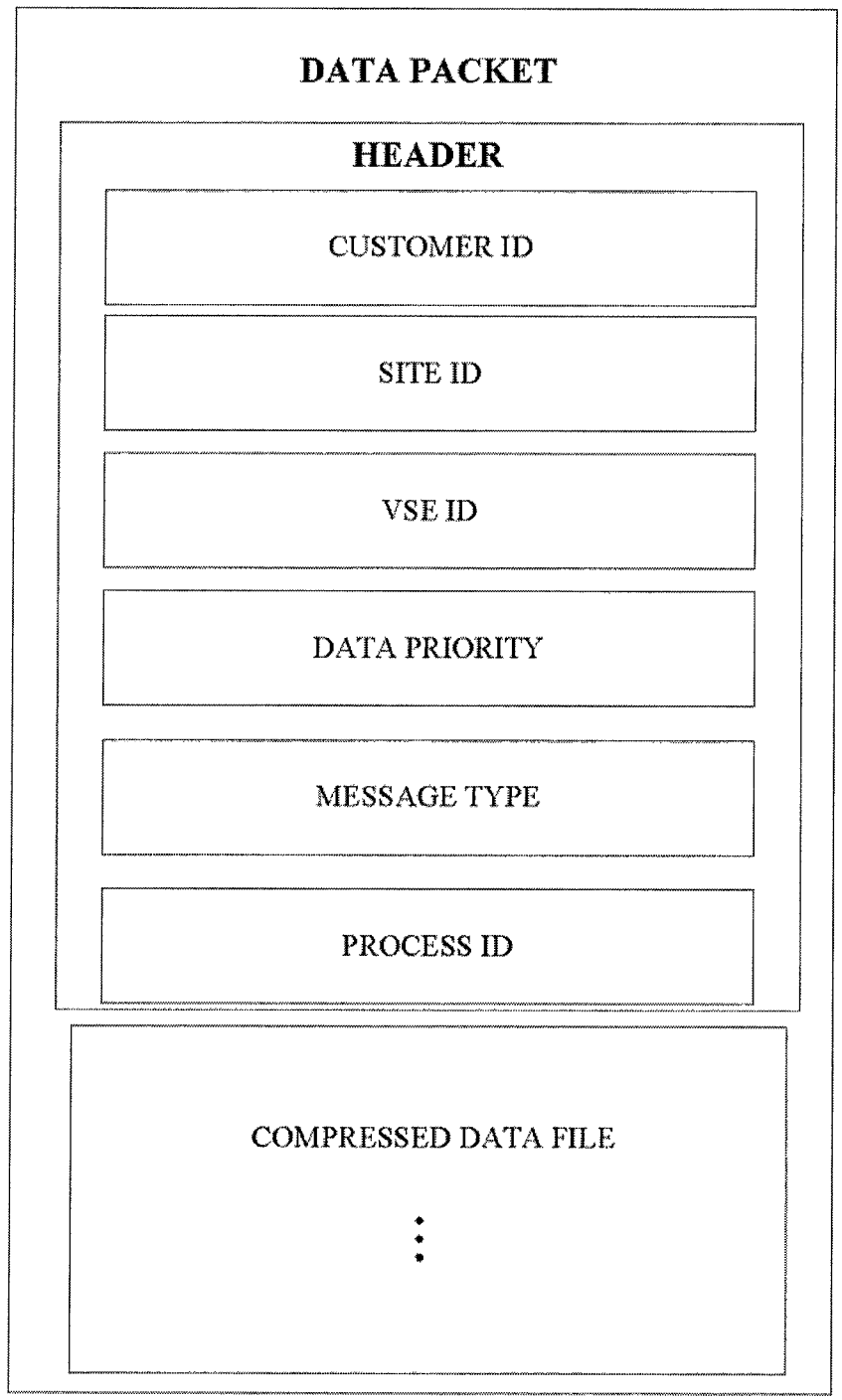
FIG. 8 illustrates an example data packet.

An exemplary data packet is illustrated in FIG. 8. In addition to a data file, the data packet includes a header, which includes one or more of a unique customer identifier (ID), a site ID representing a particular industrial facility, a virtual support engineer ID, a data priority for the data in the data file, a message type, and a process ID. Packaging the data in this way allows data from diverse data sources to be packaged together using a uniform, generic data packaging schema so that the data can be moved to the cloud infrastructure.

The manifest can include one or more of subscription information for the cloud platform 40, how to push data to the cloud platform 40, firewall settings that allow the cloud agent 60 to communicate with the cloud platform 40, and so on. The manifest may can also include associations between data and behavioral assemblies, thus allowing easy scaling to add more customized associations, and dynamic reconfiguration of associations for cloud-side parsing of received data packets.

A configuration interface of the cloud agent 60 allows modifications to be made to the manifest of the cloud agent 60. For example, users can assign priorities to respective data parameters or parameter groups at the customer site. Accordingly, when the queue processing service 70 packages the collected data to be moved to the cloud platform 40, the collected data items can be packaged into data packets according to priority (as defined in the manifest), and the respective data packet headers, or respective event data notification packets, can be populated with the appropriate priority level.

Advantageously, if access to the cloud platform 40 is disconnected, data will continue to be collected by the collection service 64 and stored locally at local storage associated with the collections service 64. When communication to the cloud platform 40 is restored, the stored data is forwarded to the cloud platform 40. Hence, data is not lost due to a lapse in connectivity with the cloud platform 40.

Returning back to FIG. 6, upon receiving a data packet 72, data in the received data packet 72 is intelligently stored in temporary storage 74 (e.g., in cloud blob storage). The infrastructure can use cloud agent reasoning and collective bargaining to determine a data storage locale. Further, based on the corresponding customer-specific data, a record linking to the stored data is created in a selected one of one or more message queues 76 of the cloud platform. The record suitably includes at least some of the customer-specific data, and the selected queue can be prioritized using a priority of the customer-specific data. The customer-specific data can be received as part of the data packet, a corresponding event data notification, or a combination of the two. Further, the customer-specific data can include or be accompanied by a selection of the one of the message queues 76. The message queues define how the data is processed in the cloud platform 40. In the present example, separate queues have been defined for alarms 78, live data 80, historical data 82, and motor drive data 84. The historical data queue 82 relates to time-series records accessed through, for example, an SQL application programming interface (API). The live data queue 80 relates to substantially real-time monitored data, such as current temperatures, current pressures, etc. The live data values can also be accessed through SQL API. The motor drives queue 84 is specific to motor drive data accessed through a DPI protocol to the respective drives. The motor drive data can relate to alarming and uploading of drive parameter data via a connector that uses the DPI protocol via, for example, a .NET class provided by the drives group.

The alarms queue 78 relates to abnormal situations, where the alarm data can also be accessed through SQL API. This alarms queue 78 can comprise multiple queues associated with different priorities to allow for different alarms having different levels of criticality. In some embodiments, servers, controllers, switches, etc., can be monitored using a number of protocols, and at a certain point (e.g., at the end of a monitoring cycle) alarms are queued up and the cloud agent 60 sends the alarms to the cloud platform 40. Alarms can be reactive (e.g., alarm when a motor fails, when a central processing unit (CPU) crashes, when an interlock is tripped, etc.) or proactive (e.g., track consumables on a machine and alarm when time to reorder, monitor cycle counts on a machine and determine when to schedule preventative maintenance, alarm when temperatures go out of defined bandwidths, send notification when a computer's memory is 80% full, etc.).

Through a configuration interface provided by the cloud agent 60, users at the plant facility 50 can dynamically configure these message queues 76. Namely, the cloud agent 60 allows the user to define these queues 76 from the on-site location and to define how data in each queue is handled. For example, the user can define, for each queue, an upload frequency to the queue, a priority level (e.g., which data queues should take processing priority over other data queues), which cloud partitions or databases data from the respective queues should be placed in, and other such information. The configuration of the message queues 76 is suitably stored in the manifest and provided to the cloud platform 40, for example, upon initialization.

In an exemplary scenario, the live data queue 80 may be defined to process live data values that are to be used by a remote operator interface application to view substantially real-time data from the plant facility 50, while the historical data queue 82 may be used to process historical data for archival storage in a historical database 86 in cloud storage 88. Accordingly, the live data queue 80 may be assigned a higher priority relative to the historical data queue 82, since data in the live data queue 80 is more time-critical than data in the historical queue 82.

On the output of the message queues 76, a worker role 90 processes data referenced in the respective queues 76 according to predefined processing definitions and according to the priorities of the data. The worker role 90 determines how data is to be processed and stored based on a manifest 92, typically a client-specific manifest, stored in the cloud storage 88. The manifest 92 references behavior assemblies 94 (e.g., a dynamic-link library (DLL)) stored in the cloud storage 88. The behavior assemblies 94 implement customer-site capabilities to process monitored data. The behavior assemblies 94 can be dynamically uploaded by a user at the plant facility 50 through the cloud agent 60, which facilitates dynamic extension of the cloud platform 40. Additional roles can be dynamically added as needed.

For example, if new data points are to be added to the cloud-based remote monitoring system 10 that require creation of a new message queue, the user can interact with the cloud agent 60 to configure a new behavior assembly for the new queue that defines such aspects as a processing priority for the data, an upload frequency for the data, where the data is to be stored within cloud storage, and other such information. The cloud agent 60 can then upload the new behavior assembly together with the data (or independently of the data). The new behavior assembly is then added to the customer's manifest 92 with the other behavior assemblies defined for the customer, so that the worker role 90 can leverage the new behavior assembly to determine how data in the new queue is to be processed. This new behavior assembly need only be uploaded to the cloud platform once.

Thereafter, data placed in the new message queue of the message queues will be processed by the worker role according to the new behavior assembly stored in the customer's manifest 92. For example, the manifest 92 may define where the data is to be stored within the cloud storage 94 (e.g., in the historical database 86 or in an alarms and live data database 96), and whether processing of the new data queue is to take priority over other data queues. In some embodiments, the manifest 92 may only accept a new behavior assembly if the behavior assembly is accompanied by a unique key associated with the client.

Once the cloud platform 40 has processed and stored the data provided by the cloud agent 60 according to the techniques described above, the data can be made accessible to one or more clients 98 for viewing. For example, data analysis on the cloud platform 40 can provide a set of web-based and browser enabled technologies for retrieving, directing, and uncompressing the data from the cloud platform to web clients. To this end, reporting services 100 can deliver data in the cloud storage 88 (e.g., from the alarm and live data database 96 or the historical database 86) to the clients 98 in a defined format. For example, the reporting services 100 can leverage monitored data stored in the cloud storage 88 to provide remote operator interfaces to the clients 98 over the Internet.

Figure 9:
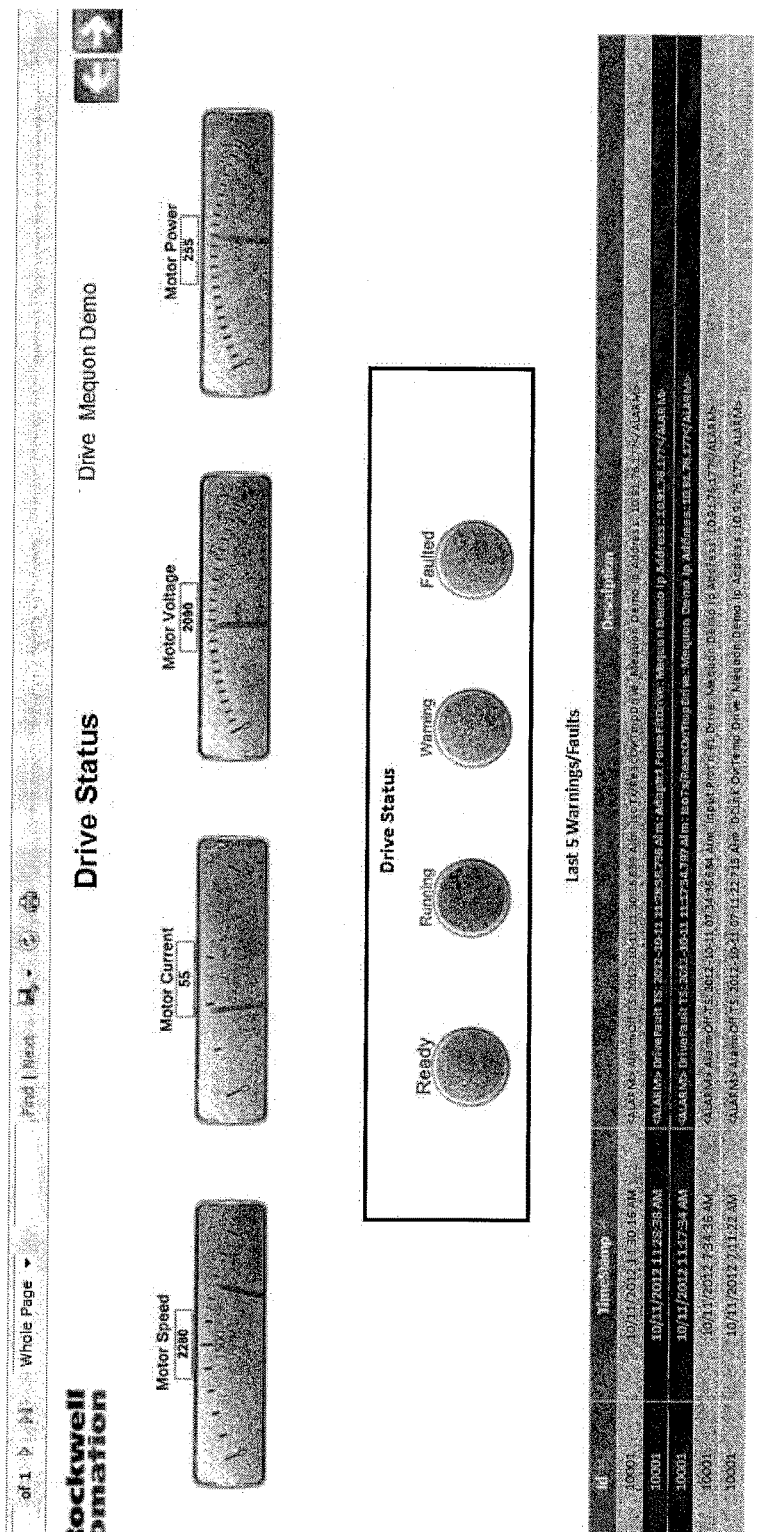
FIG. 9 illustrates an example status webpage for a motor drive that can be viewed by a web client.
Figure 10:
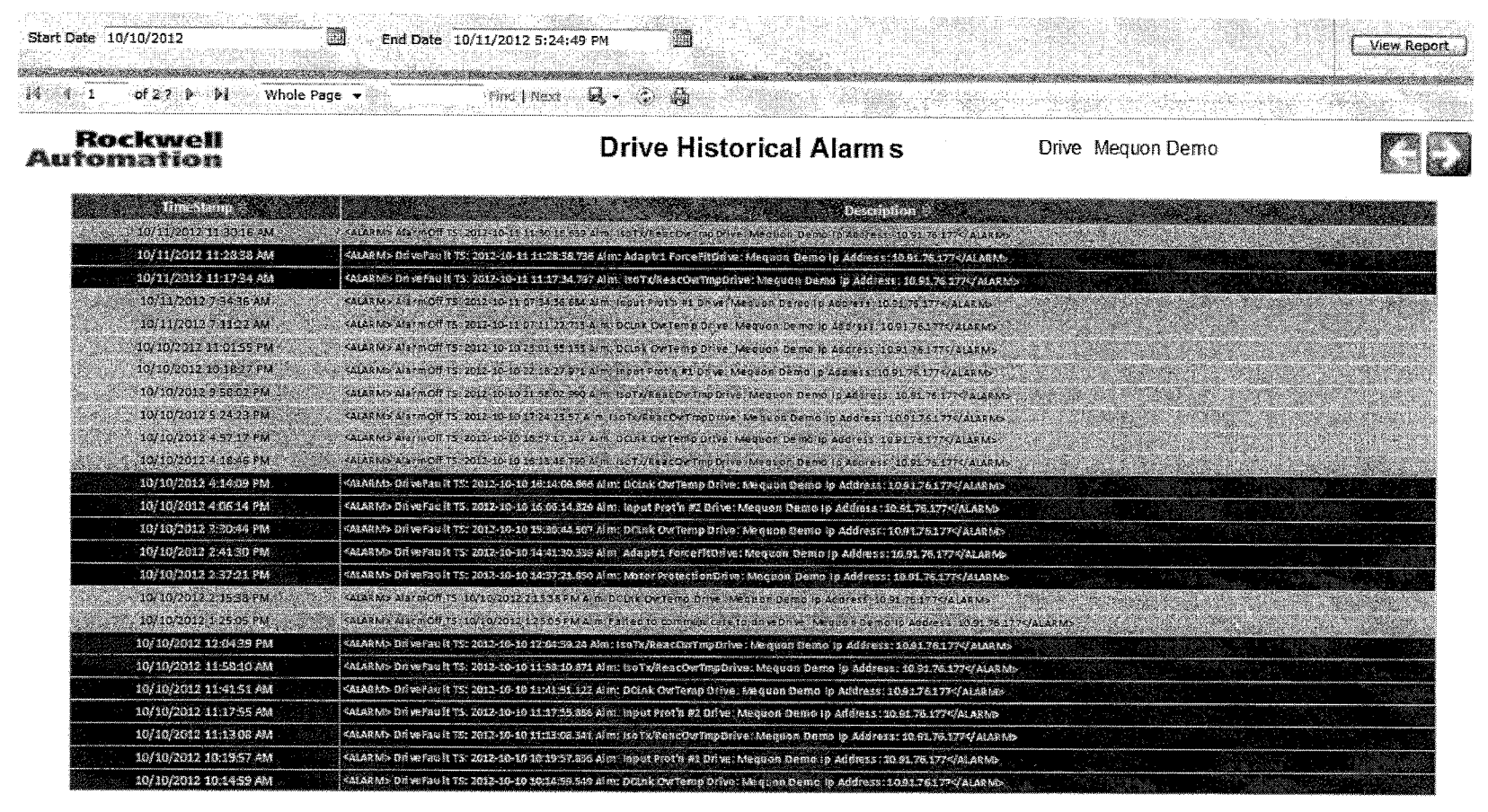
Figure 11:
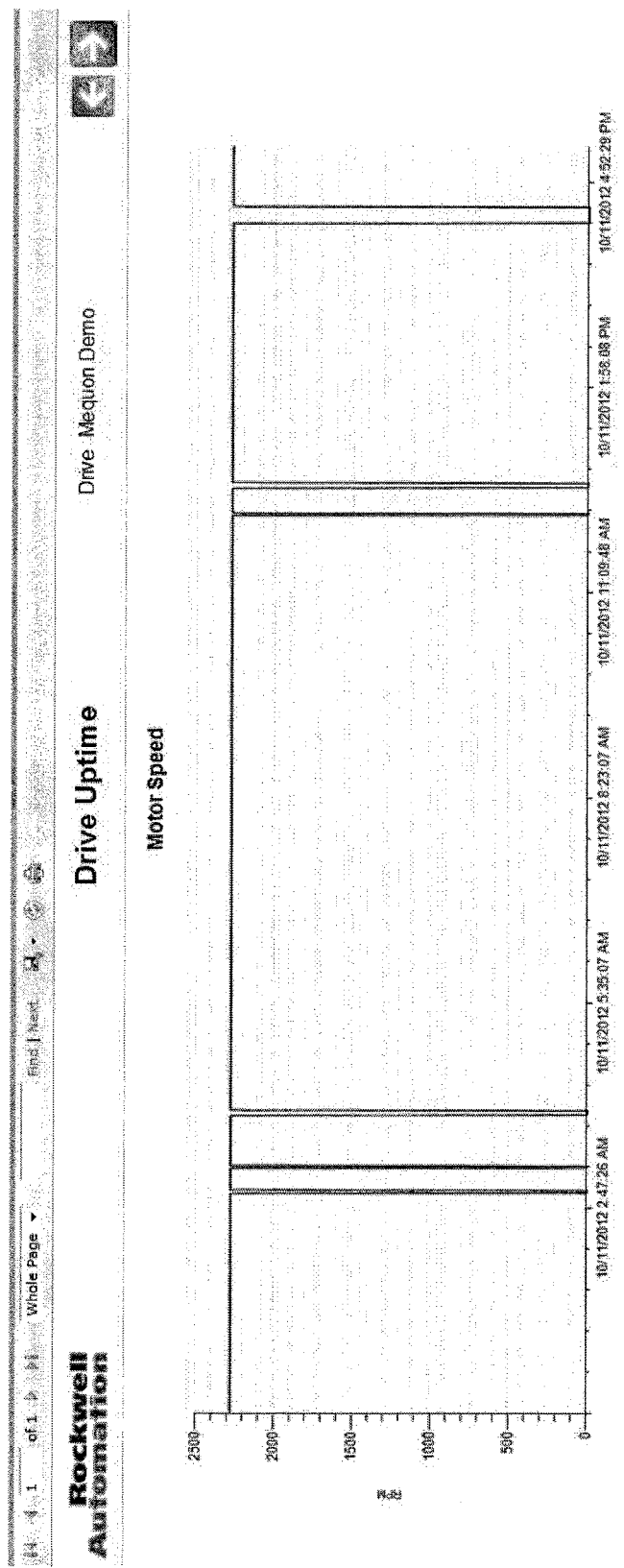
FIG. 11 illustrates an example motor speed webpage for a motor drive that can be viewed by a web client.

FIG. 9 illustrates an example status webpage for a motor drive that can be viewed by a web client of the cloud platform 40. FIG. 10 illustrates an example historical alarms webpage for a motor drive that can be viewed by a web client of the cloud platform 40. FIG. 11 illustrates an example motor speed webpage for a motor drive that can be viewed by a web client of the cloud platform 40.

Using the cloud agent 60 described above, users can organize the cloud computing infrastructure at the plant facility 50 through the cloud agent 60 without the need to redevelop, recompile, test, and re-upload services. The cloud agent 60 provides a mechanism to integrate industrial devices with the cloud platform 40, where data from the industrial devices can be leveraged by the cloud services 46. By offering users the ability to create and upload behavior assemblies for respective data types, the cloud agent 60 can facilitate dynamic allocation of cloud computing data storage and computing resources for plant data.

Embodiments, systems, and components described herein (e.g., the industrial devices, the cloud platform, the data collection system, etc.) can include, and/or be embodied by, computer or network components (e.g., servers, clients, programmable logic controllers (PLCs), communications modules, mobile computers, wireless components, control components and so forth) which are capable of interacting across a network. Computers and servers include one or more processors (i.e., electronic integrated circuits that perform logic operations employing electric signals) configured to execute instructions stored in media (e.g., random access memory (RAM), read only memory (ROM), hard drives, etc.), as well as removable memory devices (e.g., memory sticks, memory cards, flash drives, external hard drives, etc.).

Similarly, the term PLC as used herein can include functionality that can be shared across multiple components, systems, and/or networks. As an example, one or more PLCs can communicate and cooperate with various network devices across the network. This can include substantially any type of controller, communications module, computer, I/O device, sensor, actuator, and human machine interface (HMI) that communicate via the network, which includes control, automation, and/or public networks. The PLC can also communicate to and control various other devices (e.g., I/O devices, including analog, digital, and/or programmed/intelligent I/O devices, other programmable controllers, communications modules, sensors, actuators, output devices, and the like).

The network can include public networks (e.g., the Internet), intranets, and automation networks (e.g., CIP networks, including DeviceNet, ControlNet, and Ethernet/IP). Other networks include Ethernet, Data Highway (DH), Data Highway Plus (DH+), Remote I/O, Fieldbus, Modbus, Profibus, controller area network (CAN), wireless networks, serial protocols, and so forth. In addition, the network devices can include various possibilities of hardware and/or software components. These include components such as switches with virtual local area network (VLAN) capability, local area networks (LANs), wide area networks (WANs), proxies, gateways, routers, firewalls, virtual private network (VPN) devices, servers, clients, computers, configuration tools, monitoring tools, and/or other devices.

Figure 12:
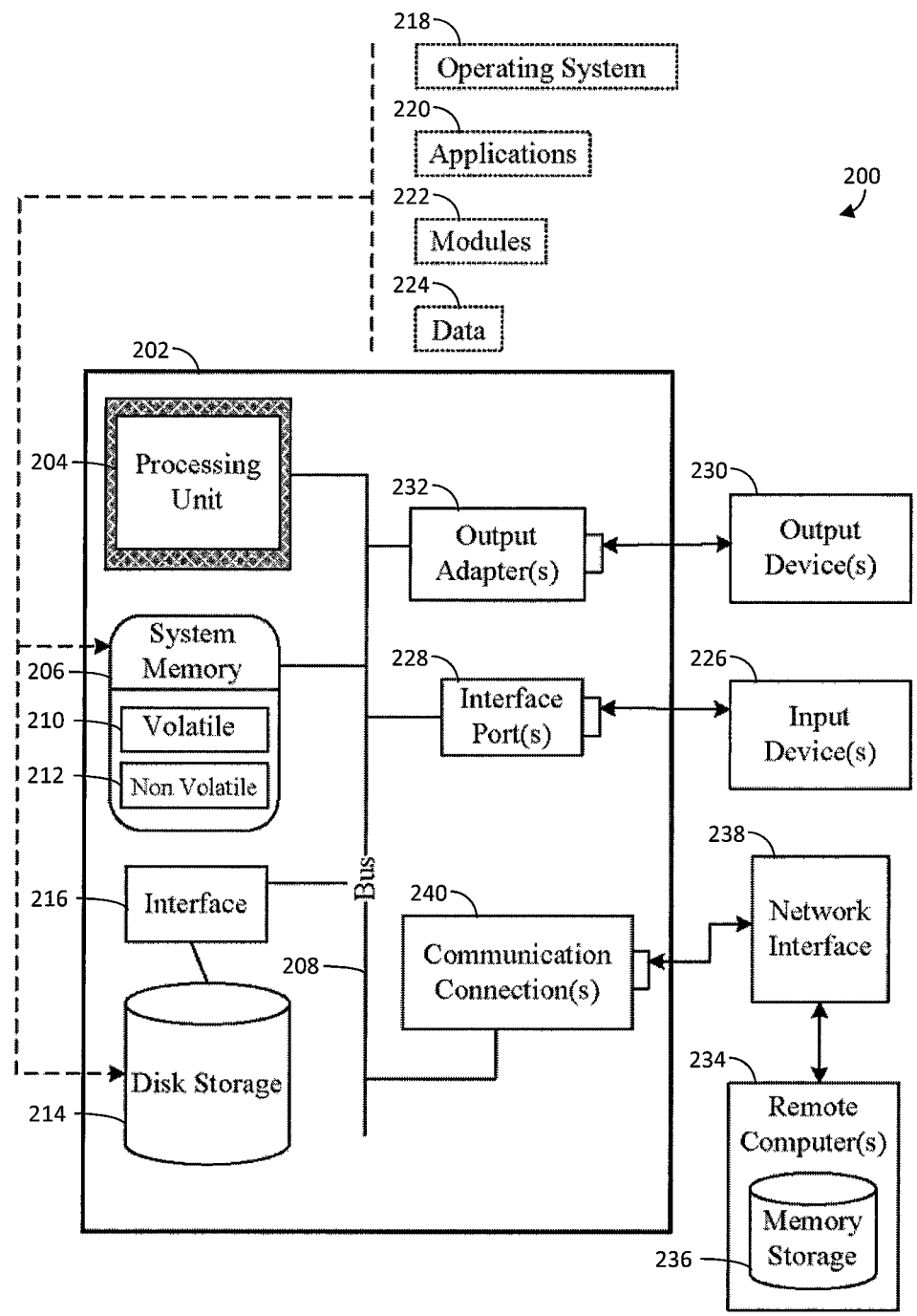
FIG. 12 illustrates an example computing environment.
Figure 13:
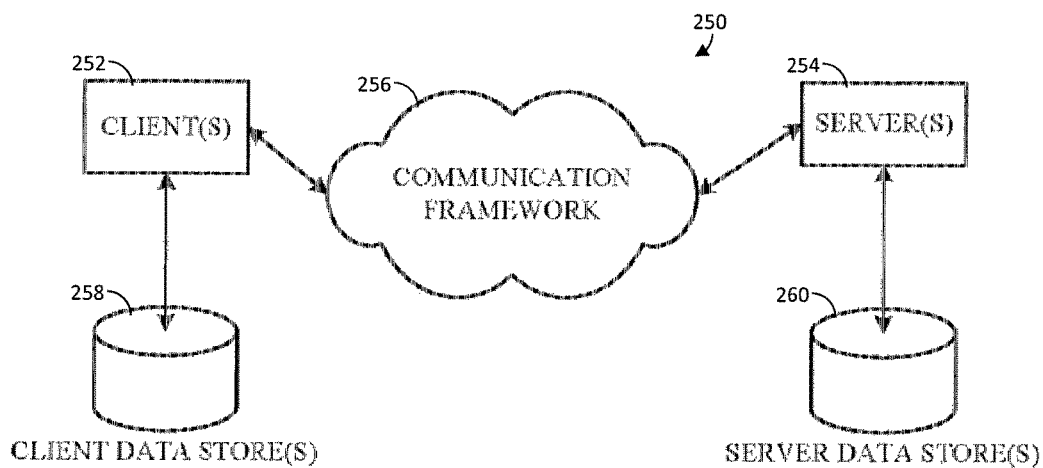
FIG. 13 illustrates an example networking environment.

In order to provide a context for the various aspects of the disclosed subject matter, FIGS. 11 and 12, as well as the following discussion, provide a brief, general description of a suitable environment in which the various aspects of the disclosed subject matter may be implemented.

With reference to FIG. 11, an example operating environment 200 for implementing various aspects of the aforementioned subject matter includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

The system bus 208 can be any of several types of bus structure(s) including a memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 206 includes volatile memory 210 and nonvolatile memory 212. The basic input/output system (BIOS), containing the basic routines to transfer information between elements within the computer 202 (e.g., during start-up), is stored in the nonvolatile memory 212. By way of illustration, and not limitation, the nonvolatile memory 212 can include read only memory (ROM), programmable ROM (PROM), electrically programmable ROM (EPROM), electrically erasable PROM (EEPROM), or flash memory. The volatile memory 210 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The computer 202 also includes removable/non-removable, volatile/nonvolatile computer storage media. FIG. 11 illustrates, for example, disk storage 214. The disk storage 214 can include a magnetic disk drive, a floppy disk drive, a tape drive, a Jaz drive, a Zip drive, a LS-100 drive, a flash memory card, a memory stick, or a like device. In addition, the disk storage 214 can include storage media separately or in combination with other storage media including, but not limited to, an optical disk drive (e.g., a compact disk (CD) ROM (CD-ROM) drive, a CD recordable (CD-R) drive, a CD rewritable (CD-RW) drive or a digital versatile disk ROM (DVD-ROM) drive). To facilitate connection of the disk storage 214 to the system bus 208, a removable or non-removable interface is typically used (e.g., an interface 216).

It is to be appreciated that FIG. 11 describes software that acts as an intermediary between users and the basic computer resources described in the operating environment 200. Such software includes an operating system 218, which can be stored on the disk storage 214, acts to control and allocate resources of the computer 202. System applications 220 (e.g., the cloud agent, in some embodiments) take advantage of the management of resources by the operating system 218 through program modules 222 and program data 224 stored either in the system memory 206 or on the disk storage 214. It is to be appreciated that one or more embodiments of the subject disclosure can be implemented with various operating systems or combinations of operating systems.

A user enters commands or information into the computer 202 through one or more input devices 226. The input devices 226 include, but are not limited to, a pointing device such as a mouse, trackball, stylus, touch pad, keyboard, microphone, joystick, game pad, satellite dish, scanner, television (TV) tuner card, digital camera, digital video camera, web camera, and the like. These and other input devices connect to the processing unit 204 through the system bus 208 via one or more interface ports 228. The interface ports 228 include, for example, a serial port, a parallel port, a game port, and a universal serial bus (USB). One or more output devices 230 use some of the same type of ports as the input devices 226. Thus, for example, a USB port may be used to provide input to the computer 202 and to output information from the computer 202 to an output device 230. Output adapters 232 are provided to illustrate that there are some output devices (e.g., monitors, speakers, and printers) which require special adapters. The output adapters 232 include, by way of illustration and not limitation, video and sound cards that provide a means of connection between these output devices and the system bus 208. It should be noted that other devices and/or systems of devices provide both input and output capabilities (e.g., one or more remote computers 234).

The computer 202 can operate in a networked environment using logical connections to the remote computers 234. The remote computers 234 can include one or more of a personal computer (PC), a server, a router, a network PC, a workstation, a microprocessor based appliance, a peer device or other common network node and the like, and typically includes many or all of the elements described relative to the computer. For purposes of brevity, only a memory storage device 236 is illustrated with the remote computers 234. The remote computers 234 are logically connected to the computer 202 through a network interface 238 and then physically connected via one or more communication connections 240. The network interface 238 encompasses communication networks (e.g., LANs and WANs). LAN technologies include fiber distributed data interface (FDDI), copper distributed data interface (CDDI), Ethernet/IEEE 802.3, Token Ring/IEEE 802.5 and the like. WAN technologies include, but are not limited to, point-to-point links, circuit switching networks like integrated services digital networks (ISDN) and variations thereon, packet switching networks, and digital subscriber lines (DSL).

The communication connections 240 refer to the hardware and/or software employed to connect the network interface 238 to the system bus 208. While the communication connections 240 are shown for illustrative clarity inside the computer 202, the communication connections 240 can also be external to the computer 202. The hardware and/or software necessary for connection to the network interface 238 includes, for exemplary purposes only, internal and external technologies (e.g., modems including regular telephone grade modems, cable modems and DSL modems, ISDN adapters, and Ethernet cards).

FIG. 12 is a schematic block diagram of an example computing environment 250 with which the disclosed subject matter can interact. The computing environment 250 includes one or more clients 252. The clients 252 can be hardware and/or software (e.g., threads, processes, computing devices, etc.). The computing environment 250 also includes one or more servers 254. The servers 254 can also be hardware and/or software (e.g., threads, processes, computing devices, etc.). The servers 254 can house threads to perform transformations by employing one or more embodiments as described herein, for example. One possible communication between a client and a server can be in the form of a data packet adapted to be transmitted between two or more computer processes. The computing environment 250 includes a communication framework 256 that can be employed to facilitate communications between the clients 252 and the servers 254. The clients 252 are operably connected to one or more client data stores 258 that can be employed to store information local to the clients 252. Similarly, the servers 254 are operably connected to one or more server data stores 260 that can be employed to store information local to the servers 254.

What has been described above includes examples of the subject innovation. It is not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. An apparatus to monitor industrial devices of an industrial facility, comprising:
a memory to store program instructions and data; and
a processor configured to execute the program instructions stored in the memory to:
monitor a parameter in a parameters archive received from the industrial devices,
store the parameter in the memory,
collect data indicative of a past state of the industrial devices from the memory according a manifest specific to the industrial facility,
subsequent to the data collection, send the collected data to a cloud platform according to the manifest, and
dynamically reconfigure the processor without interrupting the data collection and sending.

2. The apparatus of claim 1, wherein the processor is configured to execute the program instructions stored in the memory to monitor, process and store historical data and live data values read from the industrial devices.

3. The apparatus of claim 1, wherein the manifest identifies which data to collect from each of the industrial devices.

4. The apparatus of claim 1, wherein the manifest identifies the send frequency for different types of data and/or industrial devices.

5. The apparatus of claim 1, wherein the manifest identifies priorities for sending different types of data, and wherein the processor is configured to execute the program instructions stored in the memory to send the collected data to the cloud platform according to the priorities.

6. The apparatus of claim 1, wherein the manifest identifies how the sent data is processed by the cloud platform.

7. The apparatus of claim 1, wherein the processor is configured to execute the program instructions stored in the memory to dynamically reconfigure the processor, and dynamically reconfigure the cloud platform, to facilitate monitoring of new data parameters of new or existing industrial devices without interrupting the data collection, monitoring, and sending.

8. The apparatus of claim 7, wherein the processor is configured to execute the program instructions stored in the memory to send a behavior assembly controlling the processing of collected data for the new data parameters to the cloud platform to cause the cloud platform to use the behavior assembly to process data including the new data parameters using the behavior assembly.

9. The apparatus of claim 1, wherein the processor is configured to execute the program instructions stored in the memory to:
implement a data historian to monitor one or more parameters in parameters archives received from the industrial devices, and store parameters in a local storage associated with the data historian; and
implement a cloud agent to:
collect data indicative of a past state and/or a present state of the industrial devices from the local storage associated with the data historian according to the manifest,
send the collected data to the cloud platform according to the manifest, and
dynamically reconfigure the cloud agent without interrupting the data collection and sending.

10. The apparatus of claim 9, wherein the local storage is a structured query language (SQL) server database.

11. The apparatus of claim 9, wherein the data historian monitors and stores historical data and live data values read from the industrial devices.

12. The apparatus of claim 9, wherein the manifest identifies which data to collect from each of the industrial devices.

13. The apparatus of claim 9, wherein the manifest identifies a send frequency for different types of data and/or industrial devices.

14. The apparatus of claim 9, wherein the processor is configured to implement the data historian to identify priorities for sending different types of data, and wherein the processor is configured to implement the cloud agent to send the collected data to the cloud platform according to the priorities.

15. The apparatus of claim 14, wherein the manifest identifies how the sent data is processed by the cloud platform.

16. The apparatus of claim 9, wherein the processor is configured to implement the cloud agent to implement:
a collection service that collects data indicative of the past state of the industrial devices and stores the collected data in a queue, the stored data prioritized according to the manifest; and
a queue processing service that sends the stored data to the cloud platform according to the priorities of the collected data.

17. The apparatus of claim 16, wherein the processor is configured to implement the cloud agent to dynamically reconfigure the cloud agent, and to dynamically reconfigure the cloud platform, to facilitate monitoring of new data parameters of new or existing industrial devices without interrupting the collecting and the sending.

18. The apparatus of claim 16, wherein the processor is configured to implement the cloud agent to send a behavior assembly controlling the processing of collected data for the new data parameters to the cloud platform to cause the cloud platform to process data including the new data parameters using the behavior assembly.

19. The apparatus of claim 18, wherein the cloud agent is further configured to dynamically reconfigure the cloud agent, through modification of the manifest, based on commands received remotely through the cloud platform.

20. The apparatus of claim 1, wherein the processor is configured to execute the program instructions stored in the memory to collect data directly from the industrial devices, or through a middleware application.

21. The apparatus of claim 1, wherein the collected data indicative of the past state of the industrial devices includes a status parameter.

22. The apparatus of claim 21, wherein the status parameter includes at least one of:
a bit indicating if a drive is in a ready condition;
a bit indicating if the drive is running;
a bit indicating a commanded direction of rotation;
a bit indicating if the drive is accelerating;
a bit indicating if the drive is decelerating;
a bit indicating if a drive has reached a commanded speed;
a bit indicating if the drive is running on bypass;
a bit indicating if reverse rotation of the drive has been enabled;
a bit indicating if the drive is in fault mode;
a bit indicating if the drive is in warning mode; and
a drive indicating if an adaptor has local control of the drive.

23. The apparatus of claim 1, wherein the collected data indicative of the past state of the industrial devices includes at least one of:
a configurable parameter;
a status parameter;
a warning parameter;
a fault parameter; and
an alarm parameter.

24. The apparatus of claim 1, wherein the processor is further configured to execute the program instructions stored in the memory to update the manifest according to an update sent from the cloud platform, wherein the cloud platform is remote from the industrial facility.

25. An apparatus to monitor industrial devices of an industrial facility, comprising:
a memory to store program instructions and data; and
a processor configured to execute the program instructions stored in the memory to:
specify, for the industrial devices, data indicative of a past and/or a present state of the industrial devices to be collected by identifying a parameter,
collect the data indicative of a past and/or a present state of the industrial devices from the memory,
subsequent to the data collection, send the collected data to a cloud platform according to the manifest, and
dynamically reconfigure the processor without interrupting the data collection and sending.

* * * * *